United States Patent Office 3,281,423
Patented Oct. 25, 1966

3,281,423
1,3-ETHANOPIPERAZINES AND PROCESS
Edward F. Rogers, Middletown, and Harold J. Becker, Rahway, N.J., assignors to Merck & Co., Inc., Rahway, N.J., a corporation of New Jersey
No Drawing. Filed Feb. 3, 1964, Ser. No. 342,221
8 Claims. (Cl. 260—268)

This invention relates generally to novel organic compounds. More particularly, it relates to nitrogen containing bicyclic compounds. Still more specifically, it is concerned with 1,3-ethanopiperazine, and with the N-alkyl and N-acyl derivatives thereof. It relates further to the synthesis of such substances from readily available organic compounds. It is likewise concerned with the new compounds obtained as intermediates in such synthesis.

One object of the present invention is provision of the new compound 1,3-ethanopiperazine of the formula

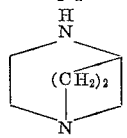

This novel substance is useful as an anthelmintic agent since it is active against the helminths classified generally as roundworms. These helminths commonly infect ruminants such as sheep, goats and cattle, as well as monogastric animals such as swine and horses. The 1,3-ethanopiperazine of this invention, and the alkyl and acyl derivatives discussed hereinafter, are effective in combatting these helminths when administered orally to the host animals, preferably at dose levels of 500–1,500 mg./kg. of host body weight.

A further object of the invention is provision of alkyl and acyl derivatives of 1,3-ethanopiperazine, said derivatives being those of the formula

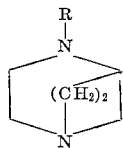

where R represents lower alkyl such as methyl, ethyl, propyl, and amyl; formyl or lower alkanoyl such as acetyl, propionyl, butyryl and valeroyl, or benzoyl. These 4-R 1,3-ethanopiperazines likewise are useful as anthelmintic agents.

Still another object is provision of a method for making the foregoing compounds from 2-(2-hydroxyethyl) pyrazine. An additional object is provision of novel piperazine compounds that are useful as intermediates in such a synthesis.

In accordance with the invention, 1,3-ethanopiperazine, and the 4-alkyl and 4-acyl derivatives thereof, are produced by a process which may be represented structurally as:

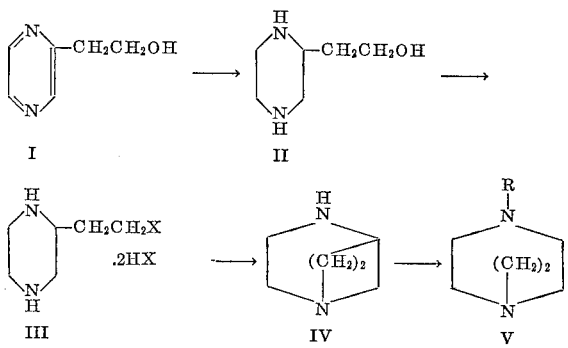

where X represents halogen, and preferably chlorine or bromine, and R represents alkyl or acyl, as previously defined. The 1,3-ethanopiperazine of Formula IV above may alternatively be defined or described chemically as 1,4-diazabicyclo-[3,2,1-octane].

According to the first step in the process of this invention, 2-(2-hydroxyethyl) piperazine is obtained by the catalytic reduction of 2-(2-hydroxyethyl) pyrazine. This reduction process is preferably carried out in a suitable solvent medium such as a lower alkanol, e.g. methanol, ethanol, butanol and the like. A solution of the pyrazine is treated with hydrogen in the presence of a suitable hydrogenation catalyst. For this purpose, it is preferred to use a noble metal catalyst such as platinum or palladium, although Raney nickel is also suitable. Very good results have been obtained when platinum oxide is used as the hydrogenation catalyst. The reaction is normally carried out at about room temperature at hydrogen pressures of from about 10–50 pounds per square inch. The reaction is continued until the theoretical amount of hydrogen is absorbed. At the end of this time the catalyst is removed and the desired 2-(2-hydroxyethyl) piperazine recovered by removal of the solvent medium. The product is conveniently converted to di-acid addition salts such as the hydrochloride, hydrobromide and the like and these salts are more highly crystalline than is the free base.

2-(2-hydroxyethyl) piperazine, obtained as described above, is converted to 2-(2-haloethyl) piperazine according to the next step of the process of this invention. This is brought about by halogenating the hydroxyethyl piperazine with a suitable halogenating agent. We prefer to employ either a chlorinating or brominating agent to obtain the chloroethyl or bromoethyl piperazine compound of Formula III above. Suitable halogenating agents that might be mentioned are thionylchloride, phosphorus trichloride or tribromide in the presence of an amine, phosphorus oxychloride and hydrogen chloride-zinc chloride. The particular choice of halogenating agent is not unduly critical although very satisfactory results have been obtained by employing thionylchloride to produce 2-(2-chloroethyl) piperazine from the corresponding hydroxyethyl compound. The 2-(2-bromoethyl) piperazine may be produced in similar fashion from the hydroxyethyl piperazine. These haloethyl piperazine substances are produced in the forms of di-acid addition salts, namely the di-hydrochloride or di-hydrobromide. These salts are highly crystalline materials and are utilized directly in the next step of the process.

According to a further aspect of the invention, it has now been discovered that 1,3-ethanopiperazine may be produced from 2-(2-haloethyl) piperazine by intimately contacting such latter substance with a base. The particular base employed to effect this internal alkylation reaction is not unduly critical and it is possible to utilize an alkali metal hydroxide such as sodium or potassium hydroxide, alkali metal carbonate such as sodium or potassium carbonate, or an organic base of the type exemplified by pyridine, diethylamine and the like. The alkylation proceeds at room temperature in a short period of time and the desired 1,3-ethanopiperazine is conveniently recovered by distillation in the presence of a small amount of base. The piperazine may be isolated as such or it may be converted to an acid addition salt such as the dihydrochloride, dihydrobromide, sulfate, nitrate, oxylate, citrate and the like.

Also within the purview of this invention are the 4-alkyl and 4-acyl derivatives of 1,3-ethanopiperazine. Of these classes of substituted piperazines, the 4-loweralkyl, 4-loweralkanoyl and 4-benzoyl compounds are preferred. The 4-acyl-1,3-ethanopiperazines are conveniently prepared by reacting the 1,3-ethanopiperazine with a suitable acylating agent. For this purpose, they may be employed an acyl halide such as benzoyl halide, acetyl halide, propionyl halide and the like or a lower aliphatic acid anhydride in the presence of a base such as pyridine. In this manner there are produced 4-acetyl-1,3-ethanopiperazine, 4-benzoyl-1,3-ethanopiperazine, 4-propionyl-1,3-ethanopiperazine and 4-butyroyl-1,3-ethanopiperazine.

The 4-loweralkyl derivatives of 1,3-ethanopiperazine are conveniently produced by intimately contacting 1,3-ethanopiperazine with a lower alkylating agent such as methyl iodide, ethyl iodide, propyl bromide, methyl bromide and the like. This reaction is carried out in the presence of an inert solvent such as acetone or methylethyl ketone. The desired 4-alkyl compound may be recovered from the reaction mixture by methods known to those skilled in this art.

The following examples are given for the purpose of illustration and not by way of limitation.

*Example 1.—2-(2-hydroxyethyl) piperazine*

10 gm. of 2-(2-hydroxyethyl) pyrazine in 150 ml. of methanol is hydrogenated at 40 lb. hydrogen pressure at room temperature in the presence of 2.5 gm. of platinum oxide. The calculated amount of hydrogen is absorbed in 20 hours. After removal of the catalyst, by filtration, the solvent is distilled off under vacuum. 2-(2-hydroxyethyl) piperazine is obtained as a pale yellow oil which becomes solid but oily. A small sample of this solid is treated with excess hydrogen chloride in methanol. 2-(2-hydroxyethyl) piperazine dihydrochloride precipitates. After filtration and drying it has an M.P. ca. 210° C.

*Example 2.—2-(2-chloroethyl) piperazine dihydrochloride*

20 gm. of 2-(2-hydroxyethyl) piperazine is cooled in Dry Ice. Thionyl chloride is added in 3 ml. portions with Dry Ice cooling to hold the temperature below 40° C. A solid forms as soon as the addition of the thionyl chloride is begun and mixing becomes difficult. After addition of 15 ml. of thionyl chloride, the reaction mixture is nearly solid. A total of 100 ml. of thionyl chloride is added, and the mixture then heated on a steam bath under reflux conditions for 5½ hours. The reaction mass is then cooled to about room temperature and the solid product recovered by filtration. The solid is dried to give 2-(2-chloroethyl) piperazine dihydrochloride, M.P. 342° C. It is dissolved in a minimum volume of water and reprecipitated with acetone to give substantially pure material, M.P. 348–350° C. (dec.).

*Example 3.—1,3-ethanopiperazine*

60 gm. of 2-(2-chloroethyl) piperazine dihydrochloride is suspended in 45 ml. of water. To this suspension there is added with cooling a solution of 45 gm. of sodium hydroxide in 45 ml. of water. The resulting solution is extracted with 5×250 ml. of chloroform, the chloroform extracts combined, dried over sodium sulfate, and then evaporated to dryness in vacuo to an oil. A few pellets of sodium hydroxide are added to the residue and the oil distilled under 3 mm. Hg vacuum at a bath temperature of below 100° C. The distillate of 1,3-ethanopiperazine is collected, and becomes solid, but oily, at room temperature. A portion of the product is converted to the dihydrochloride salt, M.P. 348° C. (dec.) by treating it with excess hydrogen chloride in methanol.

*Example 4.—4-benzoyl-1,3-ethanopiperazine*

0.5 gm. of 1,3-ethanopiperazine in 3 ml. of 10% sodium hydroxide is treated with five 0.2 ml. portions of benzoyl chloride with cooling. The solution is maintained alkaline. The odor of benzoyl chloride disappears and solution is complete. The solution is extracted with 3×5 ml. of chloroform. The chloroform extracts are combined and dried over sodium sulfate. The chloroform solution is then concentrated to dryness in vacuo to a syrup. This syrup is dissolved in a minimum volume of ether. The ether solution is chilled, and 4-benzoyl-1,3-ethanopiperazine crystallizes. The product is recovered by filtration and recrystallized from ether to give substantially pure material, M.P. 95–97° C.

*Example 5.—4-methyl-1,3-ethanopiperazine*

To a solution of 11.3 gm. of 1,3-ethanopiperazine in 15 ml. of acetone there is added slowly with stirring 14.2 gm. of methyl iodide. The resulting mixture is refluxed for two hours and then evaporated to dryness in vacuo. The residue is dissolved in water and made alkaline with dilute sodium hydroxide solution. The resulting aqueous solution is extracted with five 10 ml. portions of chloroform. The chloroform extracts are combined, dried over sodium sulfate and then concentrated to dryness in vacuo. The residue thus obtained is distilled under vacuum. The fraction distilling at 67–70° C./20 mm. Hg is predominantly 4-methyl-1,3-ethanopiperazine.

Any departure from the above description which conforms to the present invention is intended to be included within the scope of the claims.

What is claimed is:

1. A member of the group consisting of 2-(2-hydroxyethyl) piperazine and mineral acid addition salts thereof.
2. A member of the group consisting of 2-(2-haloethyl) piperazine and hydrohalide acid addition salts thereof.
3. 2-(2-chloroethyl) piperazine.
4. 2-(2-chloroethyl) piperazine dihydrochloride.
5. A compound of the formula

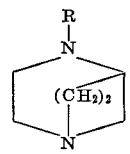

and acid addition salts thereof, where R represents a member of the group consisting of hydrogen, lower alkyl, lower alkanoyl and benzoyl.

6. 1,3-ethanopiperazine.
7. 4-benzoyl-1,3-ethanopiperazine.
8. The process for preparing 1,3-ethanopiperazine that comprises intimately contacting 2-(2-chloroethyl) piperazine with an alkali metal hydroxide.

References Cited by the Examiner

UNITED STATES PATENTS

| | | | |
|---|---|---|---|
| 2,843,589 | 7/1958 | Scigliano | 260—268 |
| 3,000,891 | 9/1961 | Janssen | 260—268 |
| 3,164,598 | 1/1965 | Freed | 260—268 |
| 3,167,561 | 1/1965 | Sarett et al. | 260—293 |
| 3,172,891 | 3/1965 | Brader et al. | 260—268 |

FOREIGN PATENTS 227,268  5/1963  Austria.

OTHER REFERENCES

Bach et al.: Journ. Amer. Chem. Soc., vol. 79, pages 2221–5, 1957.

Harfenist: Journ. American Chemical Soc., vol. 76, pages 4991–4993, 1956.

ALEX MAZEL, *Primary Examiner.*

JAMES W. ADAMS, Jr., *Assistant Examiner.*